(12) United States Patent
Onozaki

(10) Patent No.: US 9,158,096 B2
(45) Date of Patent: Oct. 13, 2015

(54) LARGE-APERTURE TELEPHOTO LENS SYSTEM

(71) Applicant: RICOH IMAGING COMPANY, LTD., Tokyo (JP)

(72) Inventor: Tatsuyuki Onozaki, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 56 days.

(21) Appl. No.: 14/053,842

(22) Filed: Oct. 15, 2013

(65) Prior Publication Data

US 2014/0104708 A1    Apr. 17, 2014

(30) Foreign Application Priority Data

Oct. 16, 2012    (JP) ................. 2012-228626

(51) Int. Cl.
*G02B 9/20* (2006.01)
*G02B 13/02* (2006.01)
*G02B 9/64* (2006.01)

(52) U.S. Cl.
CPC ....... *G02B 13/02* (2013.01); *G02B 9/20* (2013.01); *G02B 9/64* (2013.01)

(58) Field of Classification Search
CPC ............. G02B 9/12; G02B 9/14; G02B 9/16; G02B 9/18; G02B 9/20; G02B 9/24; G02B 9/26; G02B 9/28; G02B 9/34; G02B 9/60; G02B 9/62; G02B 9/64; G02B 13/02
USPC ............... 359/745–748, 754–758, 763–766, 359/771–777, 784–788
See application file for complete search history.

(56) References Cited

U.S. PATENT DOCUMENTS

| 5,751,486 A | 5/1998 | Misawa et al. |
| 2002/0075570 A1 | 6/2002 | Yamakawa |
| 2012/0050872 A1* | 3/2012 | Ito et al. ............... 359/601 |

FOREIGN PATENT DOCUMENTS

| JP | 08-122629 | 5/1996 |
| JP | 09-159911 | 6/1997 |
| JP | 2002-107616 | 4/2002 |
| JP | 2008-145584 | 6/2008 |
| JP | 2009-186609 | 8/2009 |

* cited by examiner

*Primary Examiner* — Darryl J Collins
(74) *Attorney, Agent, or Firm* — Greenblum & Bernstein, P.L.C.

(57) ABSTRACT

A large-aperture telephoto lens system includes a positive first lens group, a negative second lens group, and a positive third lens group, in that order from the object side, wherein the second lens group serves as a focusing lens group which is moved during focusing on an object at infinity to an object at a finite distance,
wherein the following conditions (1) and (2) are satisfied:

$$-4 < f/f2 < -3 \quad (1), \text{ and}$$

$$1.3 < f/f3 < 2.3 \quad (2),$$

wherein f designates the focal length of the entire large-aperture telephoto lens system, f2 designates the focal length of the second lens group, and f3 designates the focal length of the third lens group.

14 Claims, 10 Drawing Sheets

FNO.=1:1.8

SPHERICAL ABERRATION
CHROMATIC ABERRATION

W=6.2

LATERAL CHROMATIC ABERRATION

W=6.2

ASTIGMATISM

W=6.2

DISTORTION

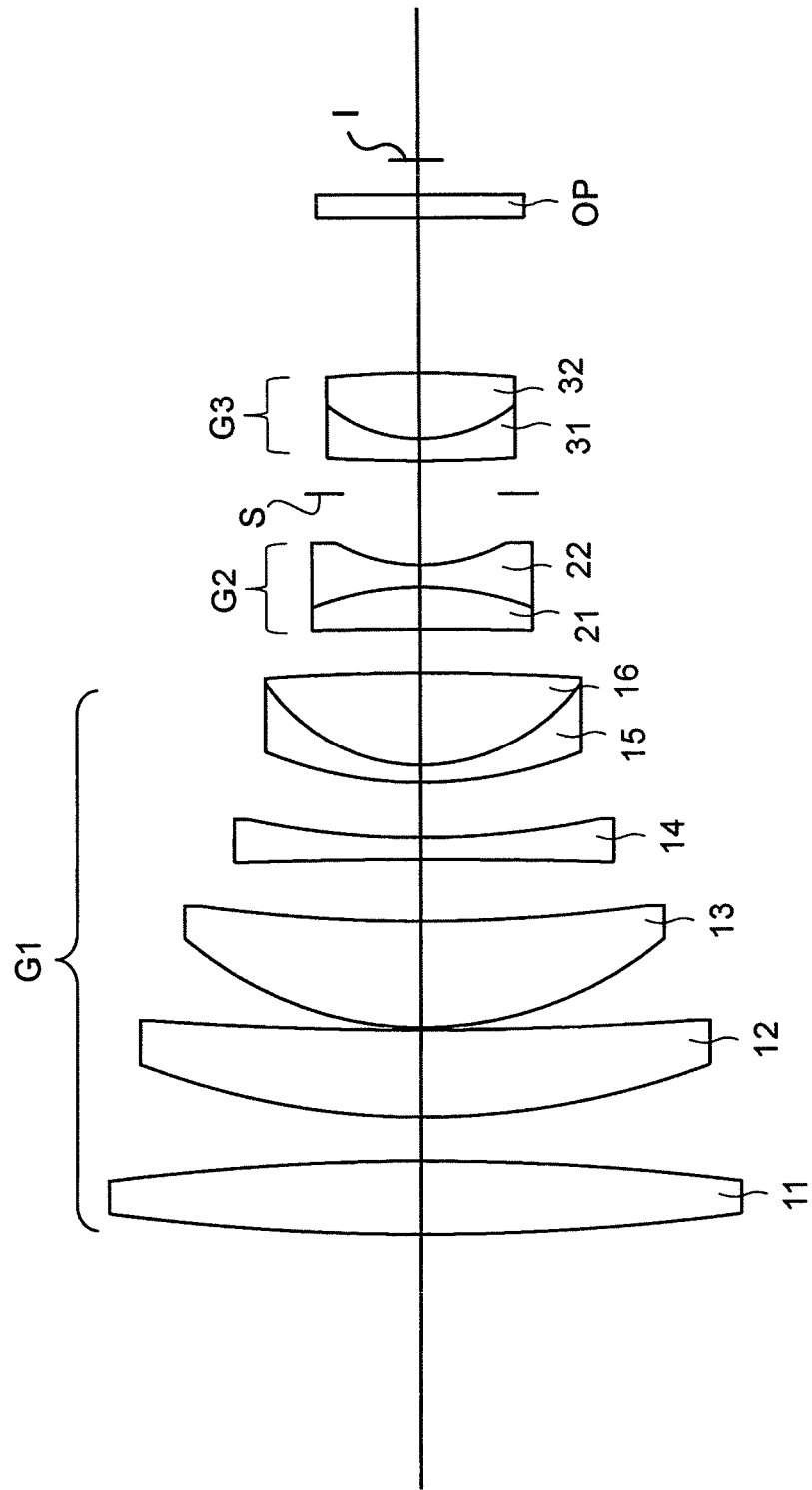

FNO.=1:1.8

SPHERICAL ABERRATION
CHROMATIC ABERRATION

W=6.2

LATERAL CHROMATIC ABERRATION

W=6.2

ASTIGMATISM

W=6.2

DISTORTION

LARGE-APERTURE TELEPHOTO LENS SYSTEM

BACKGROUND OF THE INVENTION

1. Field of the Invention

The present invention relates to a large-aperture telephoto lens system, and in particular, relates to an internal focusing large-aperture telephoto lens system which is suitable for use in an electronic still camera, in which a miniature solid-state image sensor is installed.

2. Description of Related Art

In the related art, an internal focusing telephoto lens system has been proposed with the objective of facilitating the focusing process and reducing the burden on the autofocus drive mechanism. In an internal focusing telephoto lens system, compared to a totally-telescoping lens system, it is possible to reduce movement distance of a focusing lens group that moves in the optical axis direction during a focusing operation and to reduce the weight of the focusing lens group. For example, in Japanese Unexamined Patent Publication No. H08-122629 (Patent Literature 1), Japanese Unexamined Patent Publication No. H09-159911 (Patent Literature 2), Japanese Unexamined Patent Publication No. 2002-107616 (Patent Literature 3), Japanese Unexamined Patent Publication No. 2008-145584 (Patent Literature 4) and Japanese Unexamined Patent Publication No. 2009-186609 (Patent Literature 5), internal focusing telephoto lens systems are disclosed which are configured of a positive first lens group, a negative second lens group and a positive third lens group, in that order from the object side, in which the second lens group is moved in the optical axis direction upon a focusing on an object at infinity through to an object at a finite distance.

On the other hand, miniature electronic still cameras, in which an image sensor that is sufficiently smaller than a conventional 35 mm or APS frame size, have been developed. In recent years, high specifications, especially in regard to a larger aperture diameter, have been in demand in the optical system used in such miniature electronic still cameras. Increasing the aperture diameter of an optical system is equivalent to increasing the effective aperture diameter of the lens groups, through which the axial light bundle passes. However, if the diameter and the weight of the focusing lens group increase, the burden on the autofocus drive mechanism increases. Furthermore, it also becomes difficult to attain a high imaging quality.

Such a telephoto lens system used in a miniature electronic still camera can be achieved by scaling down the optical system of a large-aperture telephoto lens system that is suitable for a convention large-sized image sensor such as those disclosed in Patent Literature 1 through 5. However, merely scaling down the optical system still results in the effective diameter of the focusing lens group being too big for use as a lens group for use in the above-described miniature camera. Whereas, if attempts are made to reduce the lens diameters in order to reduce the burden on the autofocus drive mechanism, it becomes difficult to achieve a high imaging quality.

In each of the telephoto lens systems disclosed in Patent Literature 1 through 5, since the optical-power balance is set inappropriately in each lens group of the optical system, the movement amount of the focusing lens group during focusing is large, the effective aperture diameter of the focusing lens group is large and the weight of the focusing lens group is large, thereby increasing the burden on the autofocus drive mechanism, and correction of various aberrations, such as spherical aberration, that occur during a focusing operation becomes difficult, so that the optical quality deteriorates.

Furthermore, in the internal focusing telephoto lens systems disclosed in Patent Literature 1 through 5, since the spherical aberration correction and coma correction in the first lens group, which has a strong positive refractive power, are inappropriate, a high imaging quality cannot be achieved and the aperture diameter cannot be suitably enlarged.

SUMMARY OF THE INVENTION

The present invention has been devised in consideration of the above-discussed problems and provides a large-aperture telephoto lens system which can reduce the burden on the autofocus drive mechanism by appropriately setting the optical power balance between the lens groups of the optical system so as to miniaturize and reduce the weight of the focusing lens group, and by favorably correcting various aberrations such as spherical aberration that occur during a focusing operation to thereby achieve a superior optical quality.

Furthermore, the present invention achieves a superior optical quality by appropriately setting the arrangement, shape and refractive power of each lens element provided in a first lens group in an internal focusing telephoto lens system configured of a positive first lens group, a negative second lens group, and a positive third lens group, in that order from the object side, wherein the second lens group is used as a focusing lens group by moving in the optical axis direction during a focusing operation on an object at infinity to an object at a finite distance.

According to an aspect of the present invention, a large-aperture telephoto lens system is provided, including a positive first lens group, a negative second lens group, and a positive third lens group, in that order from the object side, wherein the second lens group serves as a focusing lens group which is moved in an optical axis direction during a focusing operation on an object at infinity to an object at a finite distance. The following conditions (1) and (2) are satisfied:

$$-4 < f/f2 < -3 \qquad (1), \text{and}$$

$$1.3 < f/f3 < 2.3 \qquad (2),$$

wherein f designates the focal length of the entire large-aperture telephoto lens system, f2 designates the focal length of the second lens group, and f3 designates the focal length of the third lens group.

It is desirable for the following condition (3) to be satisfied:

$$1.4 < f/f1 < 2.1 \qquad (3),$$

wherein f designates the focal length of the entire large-aperture telephoto lens system, and f1 designates the focal length of the first lens group.

The third lens group can include a cemented lens provided with one negative lens element and one positive lens element. The negative lens element and the positive lens element of this cemented lens can be provided in that order, or vice versa.

It is desirable for the first lens group to include a positive lens element positioned closest to the image side within the first lens group. Additionally, the first lens group can include at least one negative lens element at the object side of the positive lens element that is positioned closest to the image side within the first lens group.

It is desirable for a diaphragm to be provided between the second lens group and the third lens group, and for the second lens group to be moved in the optical axis direction at a position adjacent to, and on the object side of, the diaphragm when focusing on an object at infinity through to an object at a finite distance.

The first lens group can include a positive lens element, a positive lens element, a positive lens element, a negative lens element, a negative lens element, and a positive lens element, in that order from the object side. In this case, it is desirable for the negative lens element and the positive lens element which are provided closest to the image side within the first lens group to be cemented to each other to form a cemented lens.

Alternatively, the first lens group can include a negative lens element, a positive lens element, a positive lens element, a positive lens element, a negative lens element and a positive lens element, in that order from the object side.

In an embodiment a large-aperture telephoto lens system is provided, including a positive first lens group, a negative second lens group, and a positive third lens group, in that order from the object side, wherein the second lens group serves as a focusing lens group which is moved in an optical axis direction during a focusing operation on an object at infinity to an object at a finite distance, wherein the first lens group includes a positive lens element having a convex surface on the object side, a positive meniscus lens element having a convex surface on the object side, a positive meniscus lens element having a convex surface on the object side, a negative lens element, a negative lens element having a convex surface on the object side, and a positive lens element having a convex surface on the object side, in that order from the object side.

It is desirable for the following condition (4) to be satisfied:

$$-0.9 < (R13o-R13i)/(R13o+R13i) < -0.1 \quad (4),$$

wherein R13o designates the radius of curvature of a surface on the object side of the third the positive meniscus lens element from the object side within the first lens group, and R13i designates the radius of curvature of a surface on the image side of the third the positive meniscus lens element from the object side within the first lens group.

It is further desirable for the following condition (4') to be satisfied:

$$-0.8 < (R13o-R13i)/(R13o+R13i) < -0.5 \quad (4').$$

It is desirable for the following condition (5) to be satisfied:

$$0.1 < f1/f16 < 2.5 \quad (5),$$

wherein f1 designates the focal length of the first lens group, and f16 designates the focal length of the positive lens element provided closest to the image side within the first lens group.

It is further desirable for the following condition (5') to be satisfied:

$$1.82 < f1/f16 < 2.45 \quad (5').$$

It is desirable for the negative lens element and the positive lens element that to be provided closest to the image side within the first lens group are cemented to each other to form a cemented lens.

It is desirable for the following condition (1) to be satisfied:

$$-4 < f/f2 < -3 \quad (1),$$

wherein f designates the focal length of the entire the large-aperture telephoto lens system, and f2 designates the focal length of the second lens group.

It is desirable for a diaphragm to be provided between the second lens group and the third lens group, and for the second lens group to be moved in the optical axis direction at a position adjacent to, and on the object side of, the diaphragm when focusing on an object at infinity through to an object at a finite distance.

In another embodiment, a large-aperture telephoto lens system is provided, including a positive first lens group, a negative second lens group, and a positive third lens group, in that order from the object side, wherein the second lens group serves as a focusing lens group which is moved in an optical axis direction during a focusing operation on an object at infinity to an object at a finite distance, and wherein the first lens group includes a positive lens element, a positive lens element, a positive lens element, a negative lens element, a negative lens element, and a positive lens element, in that order from the object side.

In another embodiment, a large-aperture telephoto lens system is provided, including a positive first lens group, a negative second lens group, and a positive third lens group, in that order from the object side, wherein the second lens group serves as a focusing lens group which is moved in an optical axis direction during a focusing operation on an object at infinity to an object at a finite distance, and wherein the first lens group includes a negative lens element, a positive lens element, a positive lens element, a positive lens element, a negative lens element, and a positive lens element, in that order from the object side.

According to the present invention, a large-aperture telephoto lens system is achieved which can reduce the burden on the autofocus drive mechanism by appropriately setting the optical power balance between the lens groups of the optical system so as to miniaturize and reduce the weight of the focusing lens group, and achieves a superior optical quality by favorably correcting various aberrations such as spherical aberration that occur during a focusing operation.

Furthermore, according to the present invention, a superior optical quality is achieved by appropriately setting the arrangement, shape and refractive power of each lens element provided in a first lens group in an internal focusing telephoto lens system configured of a positive first lens group, a negative second lens group, and a positive third lens group, in that order from the object side, wherein the second lens group is used as a focusing lens group by moving in the optical axis direction during a focusing operation on an object at infinity to an object at a finite distance.

The present disclosure relates to subject matter contained in Japanese Patent Application No. 2012-228626 (filed on Oct. 16, 2012) which is expressly incorporated herein in its entirety.

BRIEF DESCRIPTION OF THE DRAWINGS

The present invention will be discussed below in detail with reference to the accompanying drawings, in which:

FIG. 7 shows a third numerical embodiment of a lens arrangement of a large-aperture telephoto lens system, according to the present invention, when focusing on an object at infinity;

DESCRIPTION OF THE EMBODIMENTS

Figure 1:
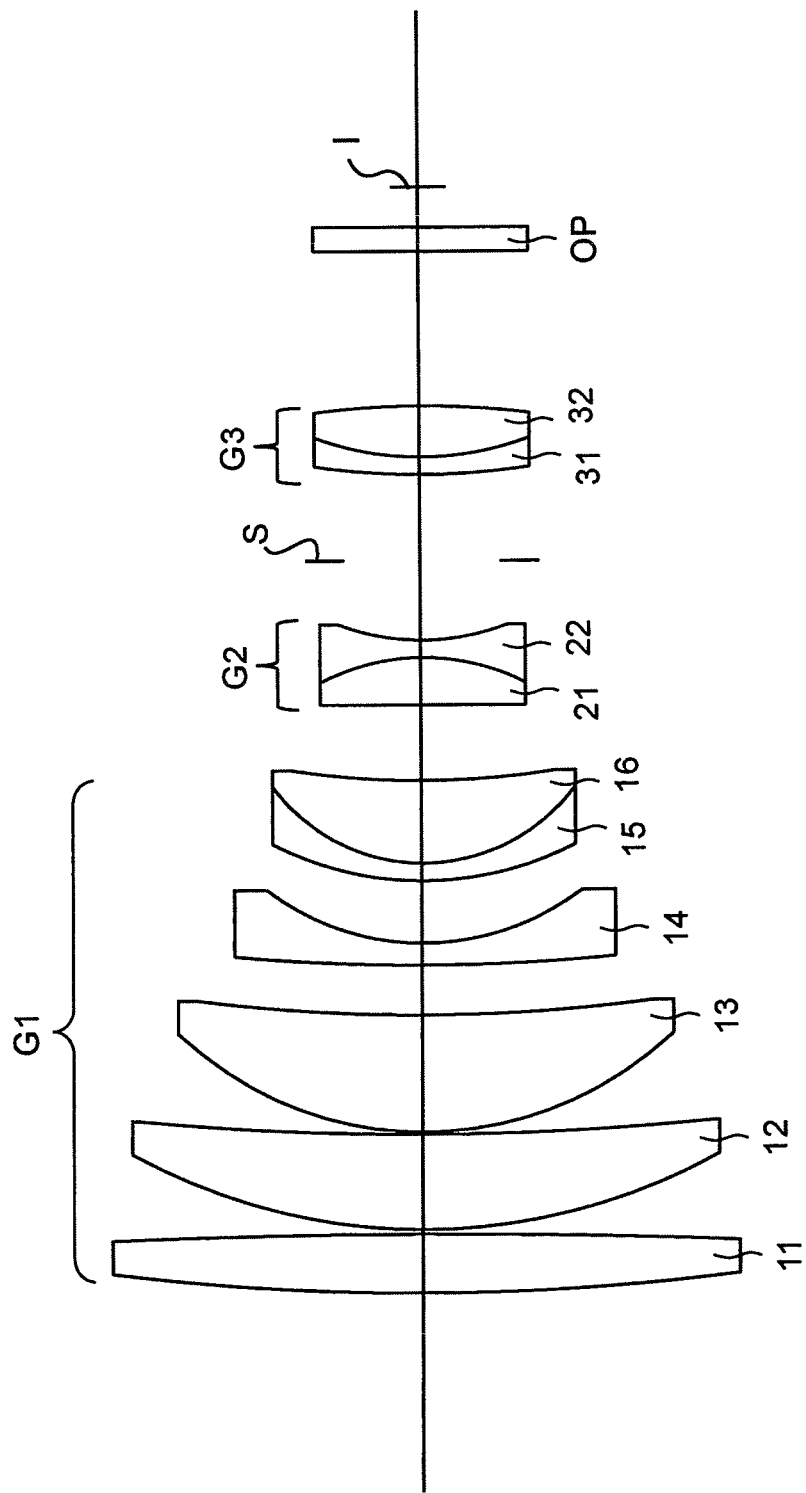
FIG. 1 shows a first numerical embodiment of a lens arrangement of a large-aperture telephoto lens system, according to the present invention, when focusing on an object at infinity.
Figures 2A, 2B, 2C, 2D:
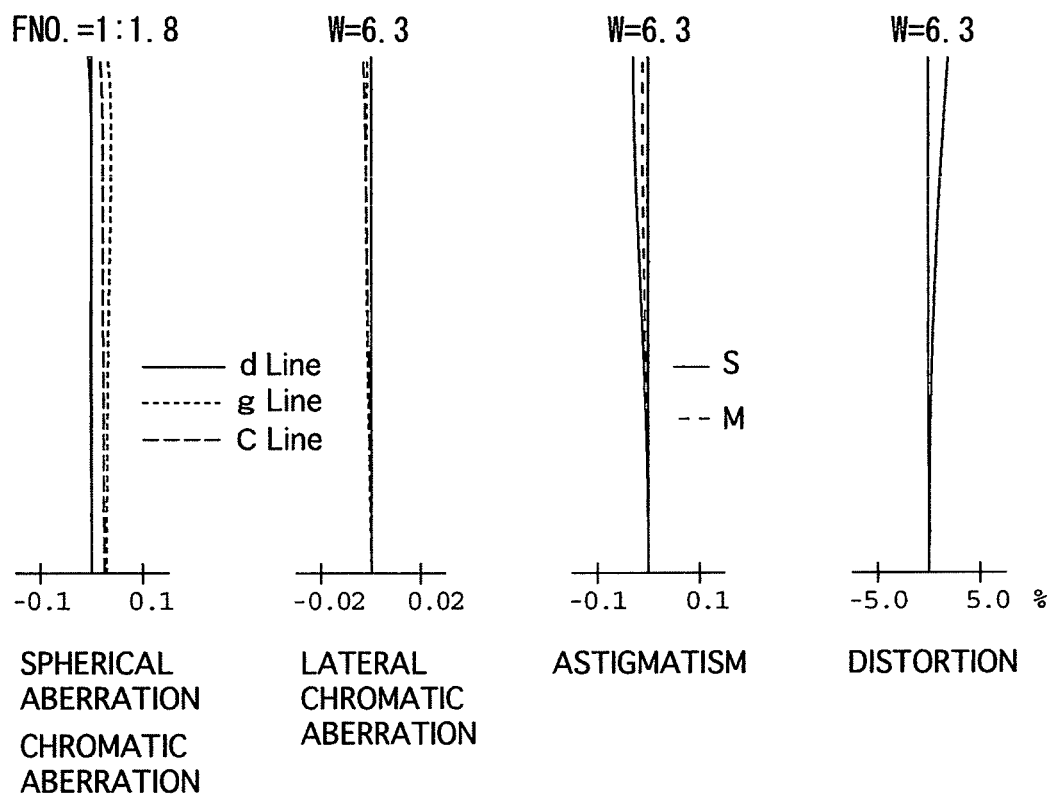
FIGS. 2A, 2B, 2C and 2D show various aberrations that occurred in the lens arrangement shown in FIG. 1.
Figure 3A:
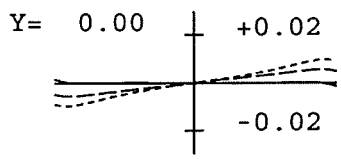
FIGS. 3A, 3B, 3C and 3D show various lateral aberrations that occurred in the lens arrangement shown in FIG. 1.
Figure 3B:
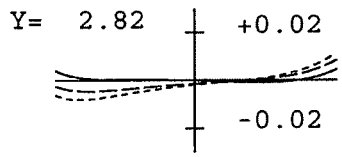
Figure 3C:
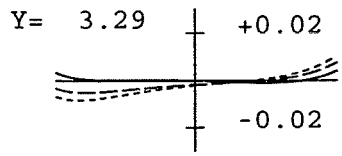
Figure 3D:
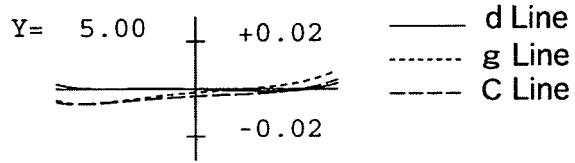

A large-aperture telephoto lens system of the illustrated embodiment, as shown in FIGS. 1, 4, 7, 10 and 13, and the first through fifth numerical embodiments, is configured of a positive first lens group G1, a negative second lens group G2, and a positive third lens group G3, in that order from the object side. A diaphragm S is provided in between the second lens group G2 and the third lens group G3. An optical filter OP is provided between the third lens group G3 and the imaging surface I. It is alternatively possible for the diaphragm S to be provided in between the first lens group G1 and the second lens group G2.

In each of the first through third numerical embodiments, the first lens group G1 is configured of a positive lens element 11, a positive lens element 12, a positive lens element 13, a negative lens element 14, and a cemented lens provided with a negative lens element 15 and a positive lens element 16, in that order from the object side. A configuration is also possible in which the negative lens element 15 and the positive lens element 16 are not cemented to each other.

In each of the fourth through fifth numerical embodiments, the first lens group G1 is configured of a negative lens element 11', a positive lens element 12', a positive lens element 13', a positive lens element 14', a negative lens element 15' and a positive lens element 16', in that order from the object side.

In each of the first through fifth numerical embodiments, the second lens group G2 is configured of a cemented lens provided with a positive lens element 21 and a negative lens element 22, in that order from the object side. The second lens group G2 is a focusing lens group which is moved in the optical axis direction upon focusing on an object at infinity to an object at a finite distance.

In each of the first through fifth numerical embodiments, the third lens group G3 is configured of a cemented lens provided with a negative lens element 31 and a positive lens element 32, in that order from the object side.

The third lens group G3 possesses the role of ultimately forming an image on the imaging surface I by the light rays that gently converge via the second lens group G2. Hence, in the large-aperture telephoto lens system of the present invention, by configuring the third lens group G3 of a cemented lens provided with the negative lens element 31 and the positive lens element 32, in that order from the object side, an image can be successfully formed on the imaging surface I while maintaining a state in which spherical aberration and chromatic aberration are favorably corrected. The order in which the negative lens element and the positive lens element are provided in the third lens group can be reversed, i.e., so that the third lens group G3 is configured of a positive lens element and a negative lens element, in that order from the object side, while obtaining the same functional effects.

In the large-aperture telephoto lens system of the illustrated embodiment, the positive lens element 16 (16') is provided closest to the image side within the first lens group G1. Accordingly, due to the positive lens element 16 (16') of the first lens group G1 strongly converging light rays in which aberrations have been favorably corrected at the object side of the positive lens element 16 (16'), the incident light-ray height at the second lens group G2, which constitutes a focusing lens group, can be lowered, so that the diameter of the second lens group G2 can be reduced. Furthermore, a favorable image-forming quality can be achieved by the positive lens element 16 (16') cancelling out spherical aberration and coma that occur at the second lens group (focusing lens group) G2.

In the large-aperture telephoto lens system of the illustrated embodiment, the first lens group G1 has an overall strong positive refractive power, and in order to suppress occurrence of spherical aberrations at each lens surface within the first lens group G1, the refractive power is dispersed by the four positive lens elements 11, 12, 13 and 16 (12',13', 14' and 16'). Furthermore, by providing the two negative lens elements 14 and 15 (11' and 15') on the object side of the positive lens element 16 (16'), which is positioned closest to the image side within the first lens group G1, aberrations such as axial chromatic aberration, lateral chromatic aberration, spherical aberration and field curvature are generated in the two negative lens elements 14 and 15 (11' and 15') to favorably cancel out (correct) aberrations generated by the four positive lens elements 11, 12, 13 and 16 (12', 13', 14' and 16'). Incidentally, if at least one negative lens element is provided on the object side of the positive lens element 16 (16'), which is positioned closest to the image side within the first lens group G1, a given aberration-correction effect can be attained.

In the large-aperture telephoto lens system of the illustrated embodiment, the second lens group G2 is configured of a cemented lens provided with a positive lens element 21 having a convex surface on the image side (a biconvex positive lens element or a positive meniscus lens element having a convex surface on the image side) and a biconcave negative lens element 22, in that order from the object side. Accordingly, fluctuations in chromatic aberration that occur during focusing can be suppressed and high-order spherical aberration can be favorably corrected.

In the large-aperture telephoto lens system of the illustrated embodiment, the diaphragm S is provided in between the second lens group G2 and the third lens group G3, and the second lens group G2 is moved in the optical axis direction at a position adjacent to, and on the object side of, the diaphragm S when focusing on an object at infinity through to an object at a finite distance. By providing the diaphragm S behind (on the image side of) the second lens group G2, which has a low axial light-ray height, the fully-open aperture diameter decreases, and enlargement of the diaphragm-control mechanism and outer diameter of the lenses can be suppressed.

In each of the first through third numerical embodiments of the large-aperture telephoto lens system, the first lens group G1 is configured of a positive lens element 11 having a convex surface on the object side (biconvex positive lens element), a positive meniscus lens element 12 having a convex surface on the object side, a positive meniscus lens element 13 having a convex surface on the object side, a negative lens element (a negative meniscus lens element having a convex surface on the object side or a biconcave negative lens element) 14, and a cemented lens provided with a negative lens element 15 having a convex surface on the object side (a negative meniscus lens element having a convex surface on the object side) and a positive lens element 16 having a convex surface on the object side (a positive meniscus lens element having a convex surface on the object side or a biconvex positive lens element), in that order from the object side. Accordingly, the strong positive refractive power provided at the object side is shared by the three positive lens elements 11, 12 and 13, so that a large-aperture light bundle can be collected while suppressing occurrence of spherical aberration and coma without using an aspherical lens surface.

Furthermore, due to each of the three positive lens elements 11, 12 and 13 of the first lens group G1 having a convex surface formed on the object side thereof, occurrence of spherical aberration can be suppressed. Furthermore, since a lens arrangement which is close to being "aplanatic" can be achieved by forming each of the positive lens elements 12 and 13 as a meniscus lens element having a convex surface on the object side, occurrence of spherical aberration and coma can be suppressed. Furthermore, due to the freedom in the air-lens defined between the positive lens element 13 and the negative lens element 14, spherical aberration and coma can be favorably corrected.

By cementing the negative lens element 15 and the positive lens element 16 together to form a cemented lens, axial chromatic aberration and lateral aberration can be favorably corrected. Furthermore, by suppressing decentration between the surfaces of the air lens that is defined between the negative lens element 15 and the positive lens element 16, occurrence of decentration coma can be suppressed so that a practical optical quality can be maintained high.

In each of the fourth and fifth numerical embodiments, the first lens group G1 is configured of a negative lens element 11', a positive lens element 12', a positive lens element 13', a positive lens element 14', a negative lens element 15' and a positive lens element 16', in that order from the object side. By providing the negative lens element 11' closest to the object side, an increase in the effective diameter of the first lens group G1 can be suppressed, and the weight of each lens element can be reduced. Furthermore, providing the negative lens element 11' closest to the object side is also effective for correcting lateral chromatic aberration within the first lens group G1.

Condition (1) specifies the ratio of the entire focal length of the lens system to the focal length of the second lens group G2. By satisfying condition (1), the refractive power of the second lens group (focusing lens group) G2 can be optimally set so that an increase of the movement amount of the second lens group G2 during focusing can be suppressed while favorably correcting aberrations.

If the upper limit of condition (1) is exceeded, the focusing movement amount of the second lens group G2 increases so that the burden on the autofocus drive mechanism also increases.

If the lower limit of condition (1) is exceeded, correction of aberrations such as spherical aberration that occurs during focusing becomes difficult.

Condition (2) specifies the ratio of the entire focal length of the lens system to the focal length of the third lens group G3. By satisfying condition (2), the refractive power of the third lens group G3, which is closely-involved with the formation of the final image, can be optimally set so that an increase in the effective diameter and weight of the second lens group (focusing lens group) G2 can be suppressed while favorably correcting aberrations.

If the upper limit of condition (2) is exceeded, the effective diameter and weight of the second lens group (focusing lens group) G2 increase, thereby increasing the burden on the autofocus drive mechanism.

If the lower limit of condition (2) is exceeded, although the effective diameter of the second lens group (focusing lens group) G2 can be reduced, correction of spherical aberration becomes difficult.

Condition (3) specifies the ratio of the entire focal length of the lens system to the focal length of the first lens group G1. By satisfying condition (3), the refractive power of the first lens group G1 can be optimally set so that aberrations can be favorably corrected.

If the upper limit of condition (3) is exceeded, correction of field curvature becomes insufficient, and correction of spherical aberration becomes difficult.

If the lower limit of condition (3) is exceeded, the field curvature becomes overcorrected.

As described above, in each of the first through third numerical embodiments, the first lens group G1 is configured of a positive lens element 11 having a convex surface on the object side, a positive meniscus lens element 12 having a convex surface on the object side, a positive meniscus lens element 13 having a convex surface on the object side, a negative lens element 14, and a cemented lens provided with a negative lens element 15 having a convex surface on the object side and a positive lens element 16 having a convex surface on the object side, in that order from the object side.

Condition (4), with respect to the first lens group G1 having the above-described lens arrangement, specifies the profile (shape factor) of the third positive meniscus lens element 13 from the object side within the first lens group G1. By satisfying condition (4), occurrence of spherical aberration in the positive meniscus lens element 13 can be effectively suppressed.

If the upper limit of condition (4) is exceeded, the refractive power of the positive meniscus lens element 13 becomes too weak, increasing the refractive power burden on the other positive lens elements 11, 12 and 16, so that spherical aberration easily occurs in these other positive lens elements 11, 12 and 16.

If the lower limit of condition (4) is exceeded, a large amount of spherical aberration occurs on the surface on the image side of the positive meniscus lens element 13.

Condition (5), with respect to the first lens group G1 having the above-described lens arrangement, specifies the ratio of the focal length of the first lens group G1 to the focal length of the positive lens element 16 provided closest to the image side within the first lens group G1. By satisfying condition (5), chromatic aberration and coma can be favorably corrected.

If the upper limit of condition (5) is exceeded, the refractive power of the positive lens element 16 becomes too strong, so that correction of coma becomes difficult.

If the lower limit of condition (5) is exceeded, the refractive power of the positive lens element 16 becomes too weak, so that correction of axial chromatic aberration and lateral chromatic aberration becomes insufficient.

Specific first through fifth numerical embodiments will be herein discussed. In the aberration diagrams, lateral aberration diagrams and the tables, the d-line, g-line and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and νd designates the Abbe number with respect to the d-line. The unit used for the various lengths is defined in millimeters (mm). An aspherical surfaced lens element is not used in any of the first through fifth numerical embodiments.

Numerical Embodiment 1

FIGS. 1 through 3D and Tables 1 and 2 show a first numerical embodiment of a large-aperture telephoto lens system according to the present invention. FIG. 1 shows a lens arrangement of the large-aperture telephoto lens system when focusing on an object at infinity. FIGS. 2A, 2B, 2C and 2D show various aberrations that occurred in the lens arrangement shown in FIG. 1. FIGS. 3A, 3B, 3C and 3D show various lateral aberrations that occurred in the lens arrangement shown in FIG. 1. Table 1 shows lens surface data, and Table 2 shows various data of the large-aperture telephoto lens system.

The large-aperture telephoto lens system according to the first numerical embodiment is configured of a positive first lens group G1, a negative second lens group G2, and a positive third lens group G3, in that order from the object side. A diaphragm S is provided between the second lens group G2 and the third lens group G3. An optical filter OP is provided in between the third lens group G3 and the image surface (image plane) I.

The first lens group G1 is configured of a biconvex positive lens element 11, a positive meniscus lens element 12 having a convex surface on the object side, a positive meniscus lens element 13 having a convex surface on the object side, a negative meniscus lens element 14 having a convex surface on the object side, and a cemented lens provided with a negative meniscus lens element 15 having a convex surface on the object side and a positive meniscus lens element 16 having a convex surface on the object side, in that order from the object side.

The second lens group G2 is configured of a cemented lens provided with a biconvex positive lens element 21 and a biconcave negative lens element 22, in that order from the object side. The second lens group G2 is a focusing lens group which is moved in the optical axis direction during focusing from infinity to a finite distance.

The third lens group G3 is configured of a negative meniscus lens element 31 having a convex surface on the object side, and a biconvex positive lens element 32, in that order from the object side.

TABLE 1

| SURFACE DATA | | | | |
|---|---|---|---|---|
| Surf. No. | R | d | N(d) | ν(d) |
| 1 | 120.745 | 2.667 | 1.48749 | 70.4 |
| 2 | −354.036 | 0.200 | | |
| 3 | 28.549 | 4.340 | 1.49700 | 81.6 |
| 4 | 142.740 | 0.100 | | |
| 5 | 16.929 | 5.320 | 1.49700 | 81.6 |

TABLE 1-continued

| SURFACE DATA | | | | |
|---|---|---|---|---|
| Surf. No. | R | d | N(d) | ν(d) |
| 6 | 84.290 | 2.267 | | |
| 7 | 96.687 | 1.000 | 1.63980 | 34.6 |
| 8 | 12.245 | 2.846 | | |
| 9 | 15.672 | 0.800 | 1.83481 | 42.7 |
| 10 | 8.858 | 3.767 | 1.77250 | 49.6 |
| 11 | 40.680 | 3.443 | | |
| 12 | 508.805 | 2.174 | 1.83400 | 37.3 |
| 13 | −10.478 | 0.800 | 1.80420 | 46.5 |
| 14 | 11.136 | 3.634 | | |
| 15(Diaphragm) | ∞ | 3.901 | | |
| 16 | 34.370 | 0.800 | 1.75211 | 25.0 |
| 17 | 14.492 | 2.330 | 1.88300 | 40.8 |
| 18 | −40.717 | 7.000 | | |
| 19 | ∞ | 1.100 | 1.51633 | 64.1 |
| 20 | ∞ | — | | |

TABLE 2

| Various Lens-System Data | |
|---|---|
| FNO. | 1.8 |
| f | 44.65 |
| W | 6.3 |
| Y | 5.00 |
| fB | 2.35 |
| L | 50.84 |

Numerical Embodiment 2

Figure 4:
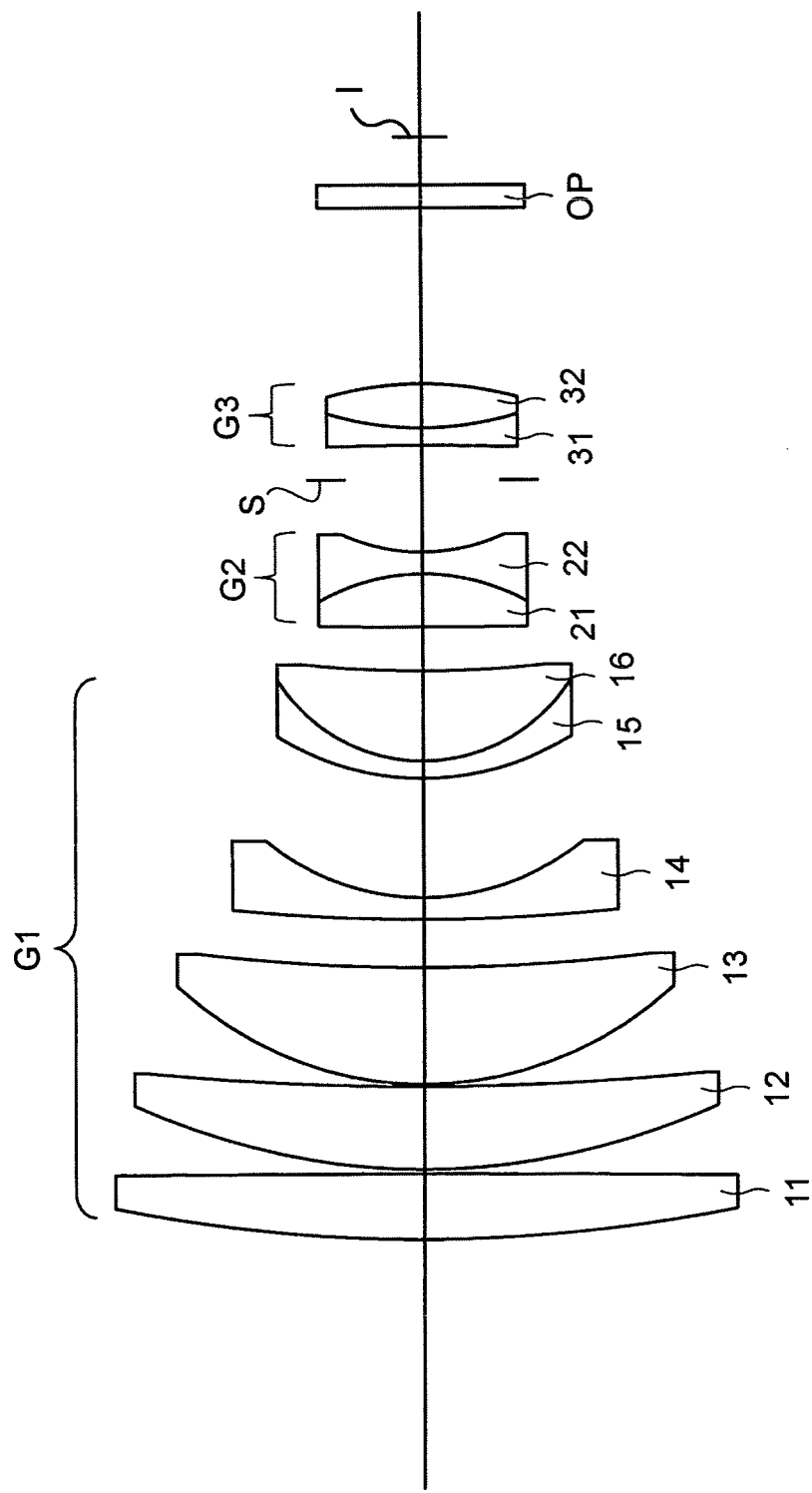
FIG. 4 shows a second numerical embodiment of a lens arrangement of a large-aperture telephoto lens system, according to the present invention, when focusing on an object at infinity.
Figure 5A:
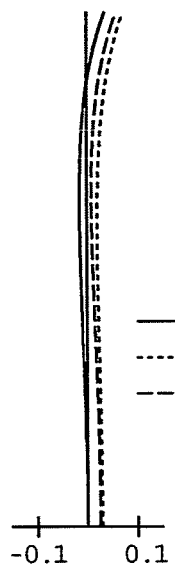
FIGS. 5A, 5B, 5C and 5D show various aberrations that occurred in the lens arrangement shown in FIG. 4.
Figure 5B:
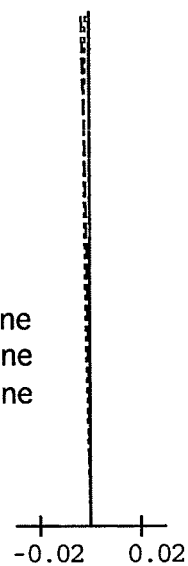
Figure 5C:
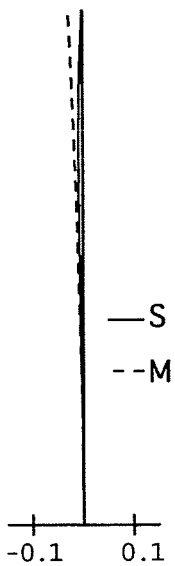
Figure 5D:
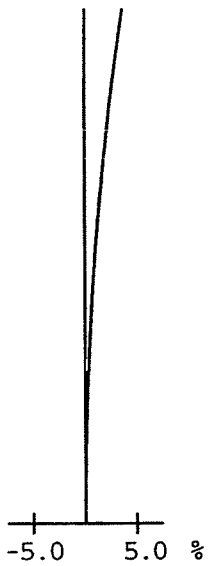
Figure 6A:
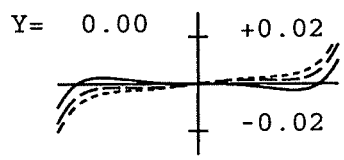
FIGS. 6A, 6B, 6C and 6D show various lateral aberrations that occurred in the lens arrangement shown in FIG. 4.
Figure 6B:
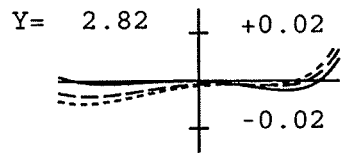
Figure 6C:
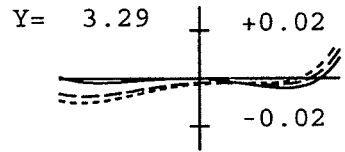
Figure 6D:
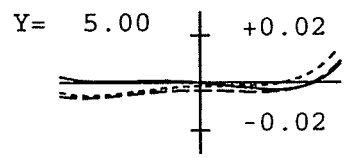
Figure 8A:
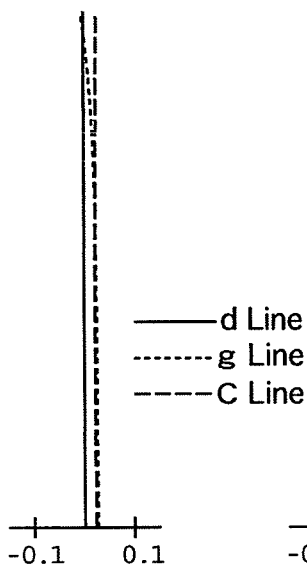
FIGS. 8A, 8B, 8C and 8D show various aberrations that occurred in the lens arrangement shown in FIG. 7.
Figure 8B:
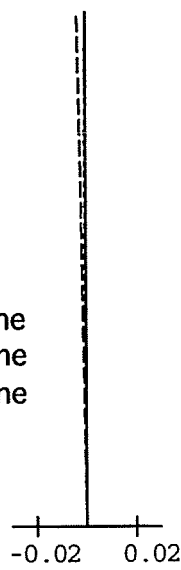
Figure 8C:
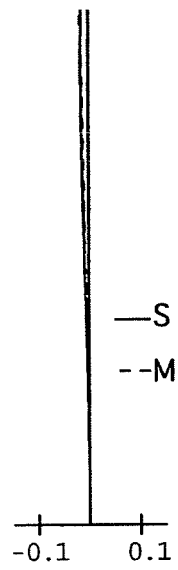
Figure 8D:
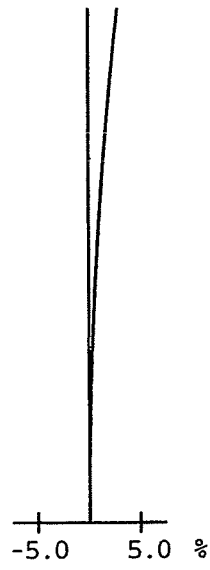
Figure 9A:
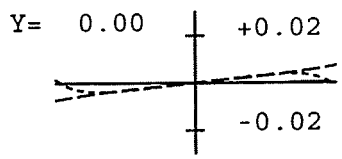
FIGS. 9A, 9B, 9C and 9D show various lateral aberrations that occurred in the lens arrangement shown in FIG. 7.
Figure 9B:
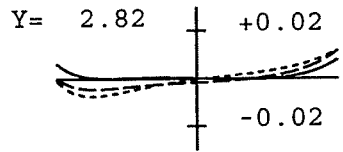
Figure 9C:
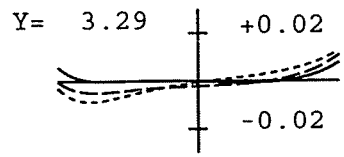
Figure 9D:
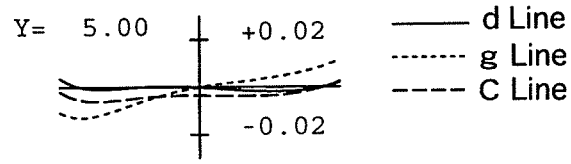

FIGS. 4 through 6D and Tables 3 and 4 show a second numerical embodiment of a large-aperture telephoto lens system according to the present invention. FIG. 4 shows a lens arrangement of the large-aperture telephoto lens system when focusing on an object at infinity. FIGS. 5A, 5B, 5C and 5D show various aberrations that occurred in the lens arrangement shown in FIG. 4. FIGS. 6A, 6B, 6C and 6D show various lateral aberrations that occurred in the lens arrangement shown in FIG. 4. Table 3 shows lens surface data, and Table 4 shows various data of the large-aperture telephoto lens system.

The lens arrangement of the second numerical embodiment is the same as that of the first numerical embodiment except for the following (1):

(1) The negative lens element 31 of the third lens group G3 is a biconcave negative lens element.

TABLE 3

| SURFACE DATA | | | | |
|---|---|---|---|---|
| Surf. No. | R | d | N(d) | ν(d) |
| 1 | 75.211 | 2.973 | 1.48749 | 70.4 |
| 2 | −1236.440 | 0.200 | | |
| 3 | 32.913 | 3.778 | 1.49700 | 81.6 |
| 4 | 136.656 | 0.100 | | |
| 5 | 17.053 | 5.349 | 1.49700 | 81.6 |
| 6 | 88.754 | 2.202 | | |
| 7 | 90.994 | 1.000 | 1.62588 | 35.7 |
| 8 | 11.932 | 5.472 | | |
| 9 | 13.158 | 0.800 | 1.83481 | 42.7 |
| 10 | 8.233 | 4.123 | 1.74330 | 49.2 |
| 11 | 57.037 | 2.000 | | |
| 12 | 351.022 | 2.428 | 1.83400 | 37.3 |
| 13 | −10.127 | 1.000 | 1.83481 | 42.7 |
| 14 | 9.386 | 3.298 | | |
| 15(Diaphragm) | ∞ | 1.563 | | |

TABLE 3-continued

SURFACE DATA

| Surf. No. | R | d | N(d) | ν(d) |
|---|---|---|---|---|
| 16 | −131.531 | 0.800 | 1.80610 | 33.3 |
| 17 | 15.708 | 2.000 | 1.88300 | 40.8 |
| 18 | −17.006 | 8.000 | | |
| 19 | ∞ | 1.050 | 1.51633 | 64.1 |
| 20 | ∞ | — | | |

TABLE 4

Various Lens-System Data

| FNO. | 1.8 |
|---|---|
| f | 44.73 |
| W | 6.2 |
| Y | 5.00 |
| fB | 2.97 |
| L | 51.10 |

Numerical Embodiment 3

FIGS. 7 through 9D and Tables 5 and 6 show a third numerical embodiment of a large-aperture telephoto lens system according to the present invention. FIG. 7 shows a lens arrangement of the large-aperture telephoto lens system when focusing on an object at infinity. FIGS. 8A, 8B, 8C and 8D show various aberrations that occurred in the lens arrangement shown in FIG. 7. FIGS. 9A, 9B, 9C and 9D show various lateral aberrations that occurred in the lens arrangement shown in FIG. 7. Table 5 shows lens surface data, and Table 6 shows various data of the large-aperture telephoto lens system.

The lens arrangement of the third numerical embodiment is the same as that of the first numerical embodiment except for the following (1), (2) and (3):

(1) The negative lens element 14 of the first lens group G1 is a biconcave negative lens element.

(2) The positive lens element 16 of the first lens group G1 is a biconvex positive lens element.

(3) The positive lens element 21 of the second lens group G2 is a positive meniscus lens element having a convex surface on the image side.

TABLE 5

SURFACE DATA

| Surf. No. | R | d | N(d) | ν(d) |
|---|---|---|---|---|
| 1 | 115.356 | 3.332 | 1.48749 | 70.4 |
| 2 | −115.353 | 1.988 | | |
| 3 | 37.571 | 3.958 | 1.49700 | 81.6 |
| 4 | 187.856 | 0.100 | | |
| 5 | 17.235 | 4.854 | 1.43875 | 95.0 |
| 6 | 76.924 | 2.833 | | |
| 7 | −281.464 | 1.000 | 1.80000 | 29.9 |
| 8 | 40.358 | 2.513 | | |
| 9 | 19.891 | 0.800 | 1.83481 | 42.7 |
| 10 | 9.024 | 4.257 | 1.65160 | 58.5 |
| 11 | −110.946 | 2.000 | | |
| 12 | −219.392 | 1.931 | 1.84666 | 23.8 |
| 13 | −14.394 | 1.000 | 1.70154 | 41.2 |
| 14 | 8.389 | 3.255 | | |
| 15(Diaphragm) | ∞ | 1.495 | | |
| 16 | 75.119 | 1.000 | 1.83400 | 37.3 |
| 17 | 7.087 | 3.000 | 1.88300 | 40.8 |
| 18 | −47.869 | 7.000 | | |

TABLE 5-continued

SURFACE DATA

| Surf. No. | R | d | N(d) | ν(d) |
|---|---|---|---|---|
| 19 | ∞ | 1.050 | 1.51633 | 64.1 |
| 20 | ∞ | — | | |

TABLE 6

Various Lens-System Data

| FNO. | 1.8 |
|---|---|
| f | 44.77 |
| W | 6.2 |
| Y | 5.00 |
| fB | 2.71 |
| L | 50.08 |

Numerical Embodiment 4

Figure 10:
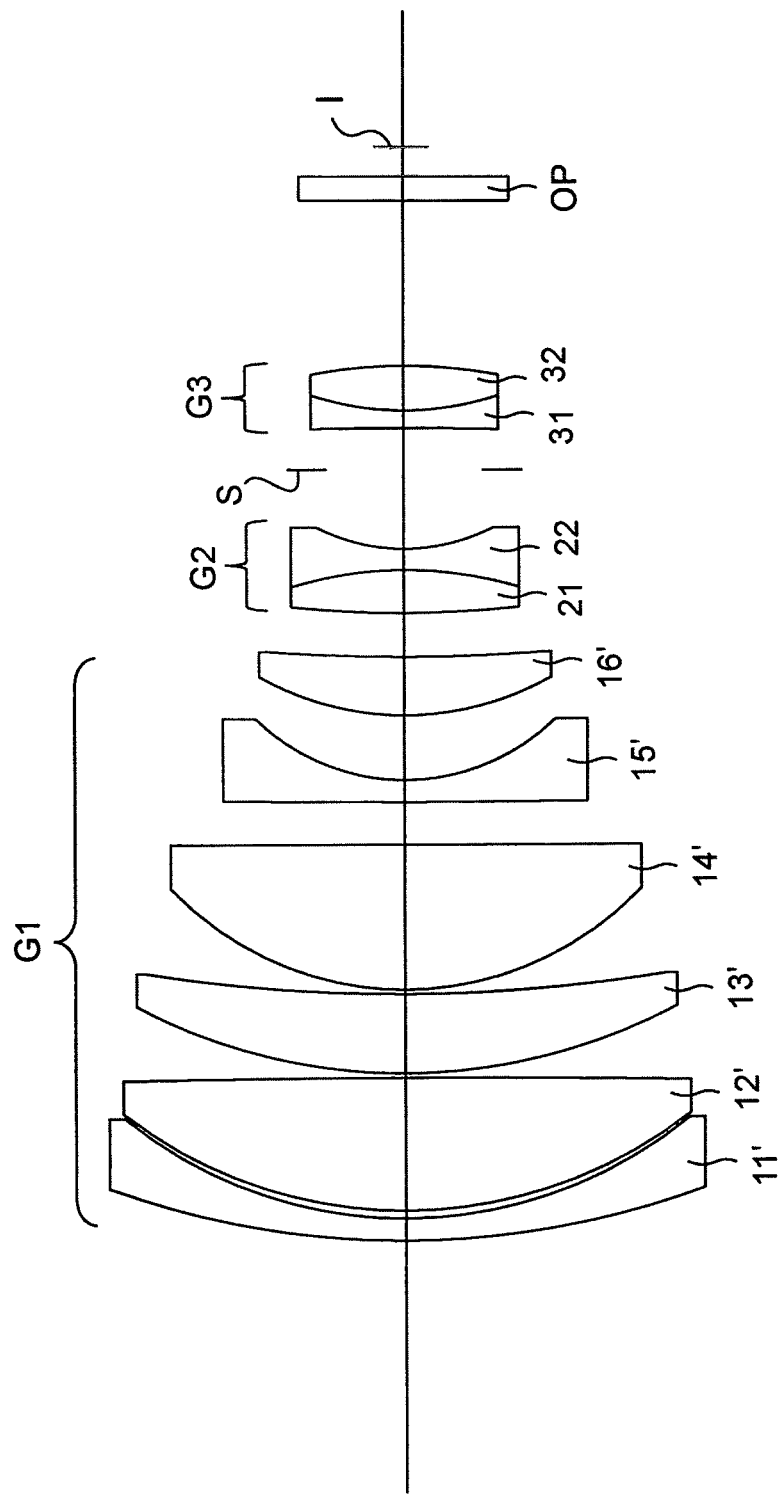
FIG. 10 shows a fourth numerical embodiment of a lens arrangement of a large-aperture telephoto lens system, according to the present invention, when focusing on an object at infinity.
Figures 11A, 11B, 11C, 11D:
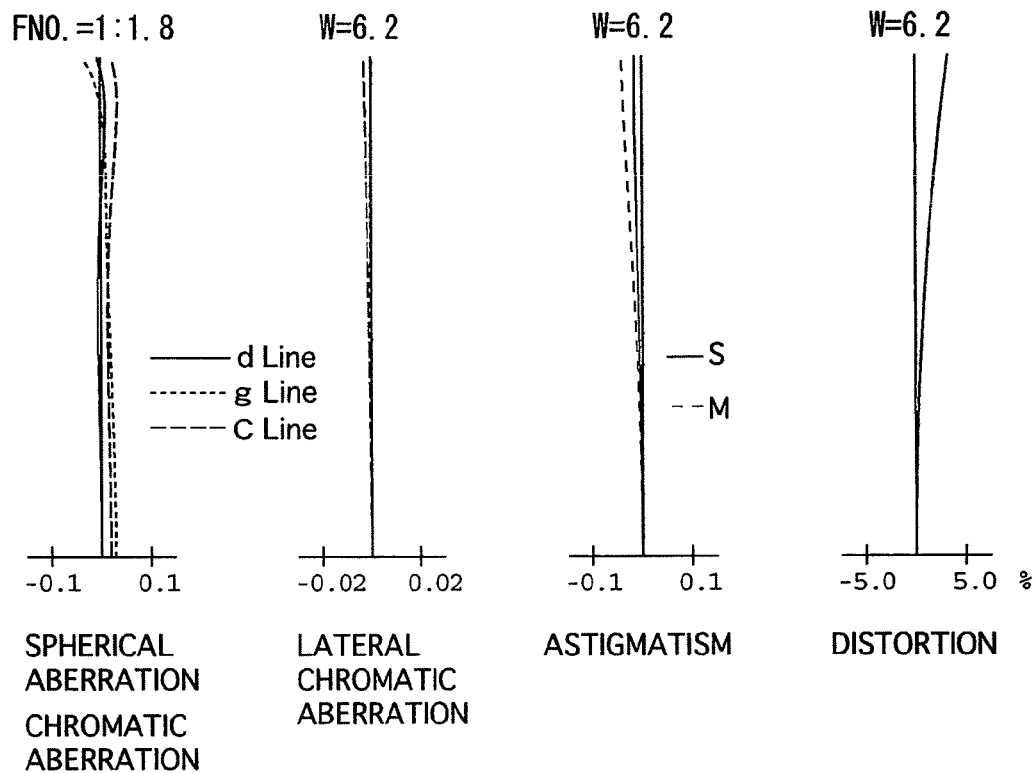
FIGS. 11A, 11B, 11C and 11D show various aberrations that occurred in the lens arrangement shown in FIG. 10.
Figure 12A:
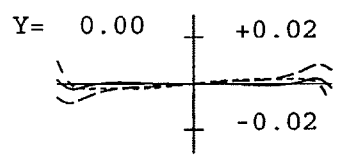
FIGS. 12A, 12B, 12C and 12D show various lateral aberrations that occurred in the lens arrangement shown in FIG. 10.
Figure 12B:
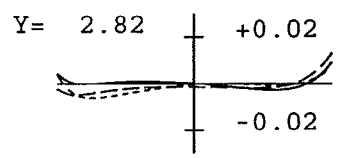
Figure 12C:
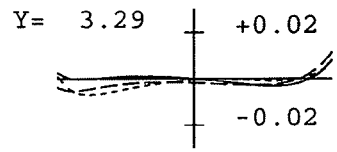
Figure 12D:
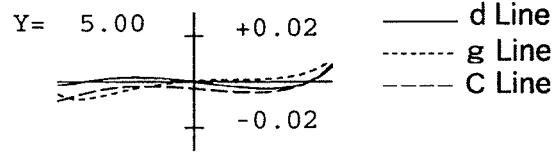

FIGS. 10 through 12D and Tables 7 and 8 show a fourth numerical embodiment of a large-aperture telephoto lens system according to the present invention. FIG. 10 shows a lens arrangement of the large-aperture telephoto lens system when focusing on an object at infinity. FIGS. 11A, 11B, 11C and 11D show various aberrations that occurred in the lens arrangement shown in FIG. 10. FIGS. 12A, 12B, 12C and 12D show various lateral aberrations that occurred in the lens arrangement shown in FIG. 10. Table 7 shows lens surface data, and Table 8 shows various data of the large-aperture telephoto lens system.

The lens arrangement of the fourth numerical embodiment is the same as that of the first numerical embodiment except for the following (1) and (2):

(1) The first lens group G1 is configured of a negative meniscus lens element 11' having a convex surface on the object side, a biconvex positive lens element 12', a positive meniscus lens element 13' having a convex surface on the object side, a positive meniscus lens element 14' having a convex surface on the object side, a negative meniscus lens element 15' having a convex surface on the object side, and a positive meniscus lens element 16' having a convex surface on the object side, in that order from the object side.

(2) The negative lens element 31 of the third lens group G3 is a biconcave negative lens element.

TABLE 7

SURFACE DATA

| Surf. No. | R | d | N(d) | ν(d) |
|---|---|---|---|---|
| 1 | 40.937 | 1.000 | 1.81600 | 46.6 |
| 2 | 20.952 | 0.353 | | |
| 3 | 21.681 | 6.007 | 1.48749 | 70.4 |
| 4 | −731.612 | 0.200 | | |
| 5 | 26.806 | 3.620 | 1.49700 | 81.6 |
| 6 | 76.588 | 0.200 | | |
| 7 | 15.104 | 6.598 | 1.49700 | 81.6 |
| 8 | 24814.531 | 1.952 | | |
| 9 | 695.831 | 1.000 | 1.60342 | 38.0 |
| 10 | 9.972 | 2.959 | | |
| 11 | 13.841 | 2.680 | 1.77250 | 49.6 |
| 12 | 88.709 | 2.000 | | |
| 13 | 51.140 | 1.957 | 1.84666 | 23.8 |
| 14 | −18.273 | 0.968 | 1.80610 | 40.7 |
| 15 | 9.042 | 3.631 | | |
| 16(Diaphragm) | ∞ | 1.886 | | |

TABLE 7-continued

SURFACE DATA

| Surf. No. | R | d | N(d) | ν(d) |
|---|---|---|---|---|
| 17 | −192.643 | 0.800 | 1.72825 | 28.3 |
| 18 | 14.243 | 2.025 | 1.74400 | 44.9 |
| 19 | −23.149 | 7.500 | | |
| 20 | ∞ | 1.100 | 1.51633 | 64.1 |
| 21 | ∞ | — | | |

TABLE 8

Various Lens-System Data

| FNO. | 1.8 |
|---|---|
| f | 44.80 |
| W | 6.2 |
| Y | 5.00 |
| fB | 2.34 |
| L | 50.78 |

Numerical Embodiment 5

Figure 13:
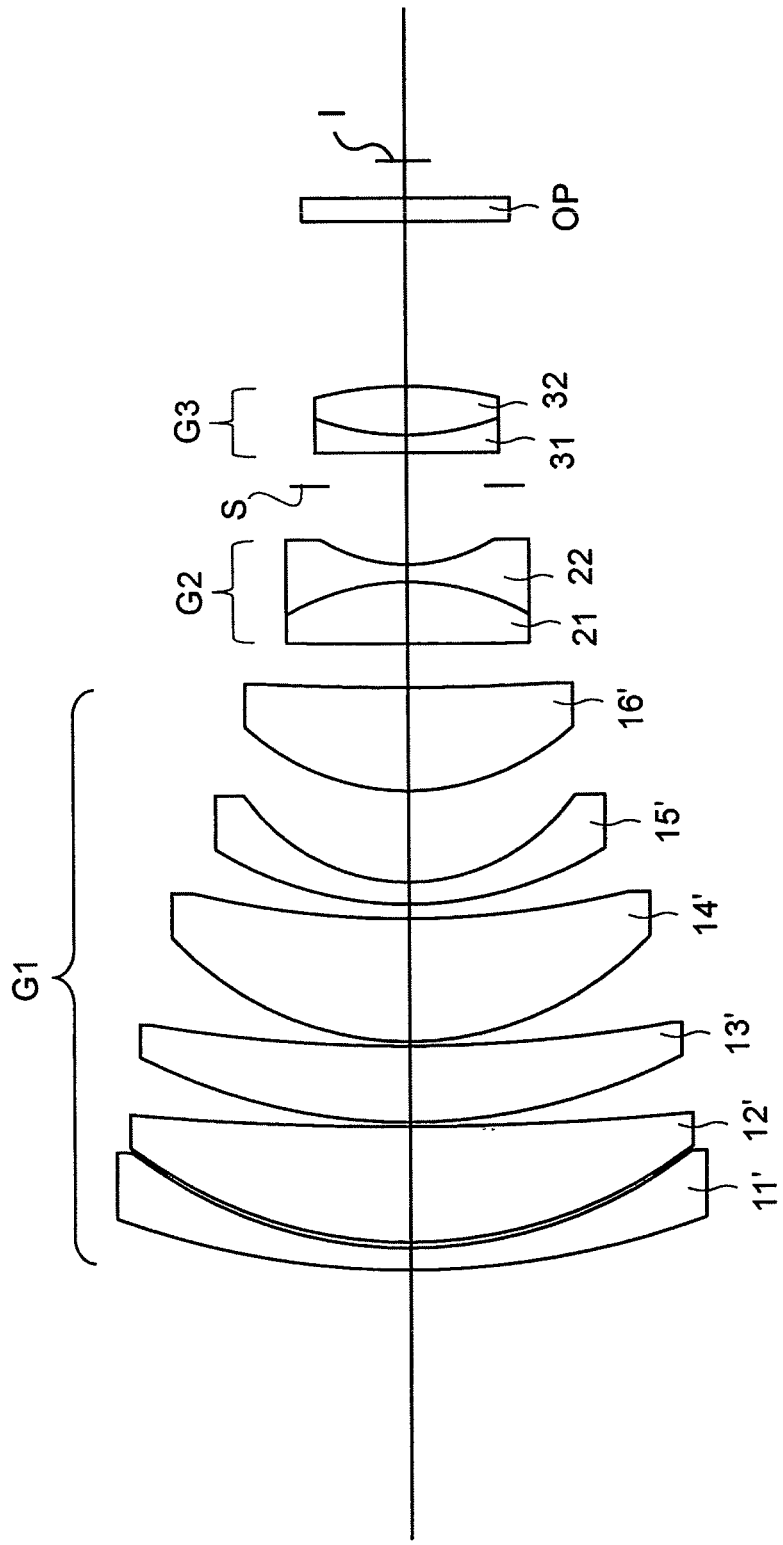
FIG. 13 shows a fifth numerical embodiment of a lens arrangement of a large-aperture telephoto lens system, according to the present invention, when focusing on an object at infinity.
Figures 14A, 14B, 14C, 14D:
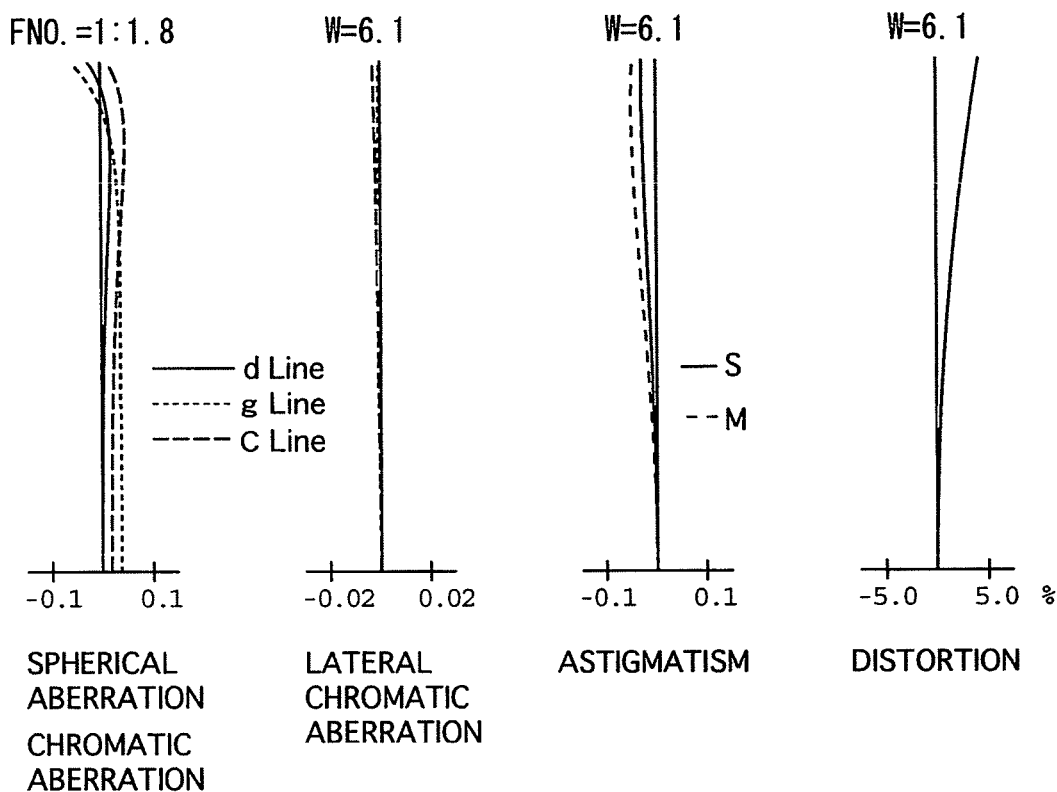
FIGS. 14A, 14B, 14C and 14D show various aberrations that occurred in the lens arrangement shown in FIG. 13.
Figure 15A:
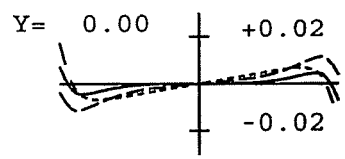
FIGS. 15A, 15B, 15C and 15D show various lateral aberrations that occurred in the lens arrangement shown in FIG. 13.
Figure 15B:
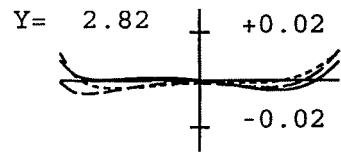
Figure 15C:
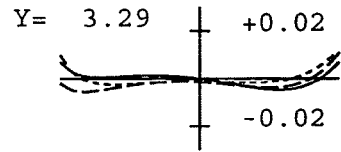
Figure 15D:
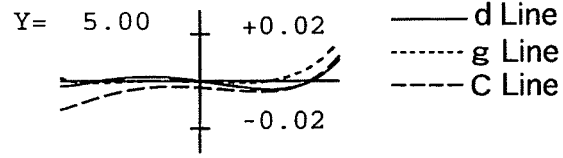

FIGS. 13 through 15D and Tables 9 and 10 show a fifth numerical embodiment of a large-aperture telephoto lens system according to the present invention. FIG. 13 shows a lens arrangement of the large-aperture telephoto lens system when focusing on an object at infinity. FIGS. 14A, 14B, 14C and 14D show various aberrations that occurred in the lens arrangement shown in FIG. 13. FIGS. 15A, 15B, 15C and 15D show various lateral aberrations that occurred in the lens arrangement shown in FIG. 13. Table 9 shows lens surface data, and Table 10 shows various data of the large-aperture telephoto lens system.

The lens arrangement of the fifth numerical embodiment is the same as that of the fourth numerical embodiment except for the following (1):

(1) The positive lens element 12' of the first lens group G1 is a positive meniscus lens element having a convex surface on the object side.

TABLE 9

SURFACE DATA

| Surf. No. | R | d | N(d) | ν(d) |
|---|---|---|---|---|
| 1 | 39.904 | 1.000 | 1.80420 | 46.5 |
| 2 | 21.194 | 0.268 | | |
| 3 | 21.595 | 5.244 | 1.48749 | 70.4 |
| 4 | 146.538 | 0.200 | | |
| 5 | 27.584 | 3.464 | 1.49700 | 81.6 |
| 6 | 72.574 | 0.200 | | |
| 7 | 15.101 | 5.600 | 1.49700 | 81.6 |
| 8 | 43.146 | 0.660 | | |
| 9 | 17.391 | 1.000 | 1.78590 | 44.2 |
| 10 | 9.425 | 4.164 | | |
| 11 | 11.284 | 4.745 | 1.65160 | 58.5 |
| 12 | 127.770 | 2.000 | | |
| 13 | 895.554 | 2.800 | 1.83481 | 42.7 |
| 14 | −11.414 | 0.800 | 1.74400 | 44.8 |
| 15 | 7.719 | 3.606 | | |
| 16(Diaphragm) | ∞ | 1.516 | | |
| 17 | −491.963 | 0.800 | 1.80400 | 46.6 |
| 18 | 12.328 | 2.216 | 1.69700 | 48.5 |
| 19 | −17.514 | 7.500 | | |
| 20 | ∞ | 1.050 | 1.51633 | 64.1 |
| 21 | ∞ | — | | |

TABLE 10

Various Lens-System Data

| FNO. | 1.8 |
|---|---|
| f | 44.72 |
| W | 6.1 |
| Y | 5.00 |
| fB | 2.61 |
| L | 51.44 |

The numerical values of each condition for each numerical embodiment are shown in Table 11. Note that since the required lens arrangement for the fourth and fifth numerical embodiments is different from that of the first through third numerical embodiments (i.e., in the fourth and fifth numerical embodiments, the first lens group G1 is configured of six lens elements: a negative lens element, a positive lens element, a positive lens element, a positive lens element, a negative lens element and a positive lens element), numerical values for the conditions (4) and (5) cannot be calculated for the fourth and fifth numerical embodiments.

TABLE 11

| | Embod. 1 | Embod. 2 | Embod. 3 | Embod. 4 | Embod. 5 |
|---|---|---|---|---|---|
| Condition (1) | −3.01 | −3.86 | −3.47 | −3.04 | −3.89 |
| Condition (2) | 2.03 | 2.28 | 1.60 | 1.33 | 1.34 |
| Condition (3) | 1.42 | 1.64 | 1.75 | 1.72 | 2.02 |
| Condition (4) | −0.67 | −0.68 | −0.63 | — | — |
| Condition (5) | 2.26 | 2.19 | 1.97 | — | — |

As can be understood from Table 11, the first through fifth numerical embodiments satisfy conditions (1) through (3), and the first through third numerical embodiments satisfy conditions (4) and (5). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A large-aperture telephoto lens system comprising a positive first lens group, a negative second lens group, and a positive third lens group, in that order from the object side, wherein said second lens group serves as a focusing lens group which is moved in an optical axis direction during a focusing operation on an object at infinity to an object at a finite distance, wherein the following conditions (1) and (2) are satisfied:

$$-4 < f/f2 < -3 \qquad (1), \text{ and}$$

$$1.3 < f/f3 < 2.3 \qquad (2), \text{ wherein}$$

f designates the focal length of the entire large-aperture telephoto lens system, f2 designates the focal length of said second lens group, and f3 designates the focal length of said third lens group, and wherein said third lens group consists of a cemented lens provided with one negative lens element and one positive lens element.

2. The large-aperture telephoto lens system according to claim 1, wherein the following condition (3) is satisfied:

$$1.4 < f/f1 < 2.1 \quad (3),$$ wherein f designates the focal length of the entire large-aperture telephoto lens system, and f1 designates the focal length of the first lens group.

3. The large-aperture telephoto lens system according to claim 1, wherein said first lens group comprises a positive lens element positioned closest to the image side within said first lens group.

4. The large-aperture telephoto lens system according to claim 3, wherein said first lens group comprises at least one negative lens element at the object side of the positive lens element that is positioned closest to the image side within said first lens group.

5. The large-aperture telephoto lens system according to claim 1, wherein a diaphragm is provided between said second lens group and said third lens group, and wherein said second lens group is moved in the optical axis direction at a position adjacent to, and on the object side of, the diaphragm when focusing on an object at infinity through to an object at a finite distance.

6. The large-aperture telephoto lens system according to claim 1, wherein said first lens group comprises a positive lens element, a positive lens element, a positive lens element, a negative lens element, a negative lens element, and a positive lens element, in that order from the object side.

7. The large-aperture telephoto lens system according to claim 6, wherein the negative lens element and the positive lens element which are provided closest to the image side within said first lens group are cemented to each other to form a cemented lens.

8. The large-aperture telephoto lens system according to claim 1, wherein said first lens group comprises a negative lens element, a positive lens element, a positive lens element, a positive lens element, a negative lens element and a positive lens element, in that order from the object side.

9. A large-aperture telephoto lens system comprising a positive first lens group, a negative second lens group, and a positive third lens group, in that order from the object side, wherein said second lens group serves as a focusing lens group which is moved in an optical axis direction during a focusing operation on an object at infinity to an object at a finite distance, wherein said first lens group includes a positive lens element having a convex surface on the object side, a positive meniscus lens element having a convex surface on the object side, a positive meniscus lens element having a convex surface on the object side, a negative lens element, a negative lens element having a convex surface on the object side, and a positive lens element having a convex surface on the object side, in that order from the object side.

10. The large-aperture telephoto lens system according to claim 9, wherein the following condition (4) is satisfied:

$$-0.9 < (R13o - R13i)/(R13o + R13i) < -0.1 \quad (4),$$ wherein

R13o designates the radius of curvature of a surface on the object side of the third said positive meniscus lens element from the object side within said first lens group, and R13i designates the radius of curvature of a surface on the image side of the third said positive meniscus lens element from the object side within said first lens group.

11. The large-aperture telephoto lens system according to claim 9, wherein the following condition (5) is satisfied:

$$0.1 < f1/f16 < 2.5 \quad (5),$$ wherein f1 designates the focal length of said first lens group, and f16 designates the focal length of the positive lens element provided closest to the image side within said first lens group.

12. The large-aperture telephoto lens system according to claim 9, wherein the negative lens element and the positive lens element that are provided closest to the image side within said first lens group are cemented to each other to form a cemented lens.

13. The large-aperture telephoto lens system according to claim 9, wherein the following condition (1) is satisfied:

$$-4 < f/f2 < -3 \quad (1),$$ wherein f designates the focal length of the entire said large-aperture telephoto lens system, and f2 designates the focal length of said second lens group.

14. The large-aperture telephoto lens system according to claim 9, wherein a diaphragm is provided between said second lens group and said third lens group, and wherein said second lens group is moved in the optical axis direction at a position adjacent to, and on the object side of, the diaphragm when focusing on an object at infinity through to an object at a finite distance.

* * * * *